(12) United States Patent
Dave et al.

(10) Patent No.: US 12,053,841 B2
(45) Date of Patent: Aug. 6, 2024

(54) LAYER-BASED DEFECT DETECTION USING NORMALIZED SENSOR DATA

(71) Applicant: DIVERGENT TECHNOLOGIES, INC., Los Angeles, CA (US)

(72) Inventors: Vivek R. Dave, Concord, NH (US); Mark J. Cola, Santa Fe, NM (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 67 days.

(21) Appl. No.: 17/375,983

(22) Filed: Jul. 14, 2021

(65) Prior Publication Data
US 2022/0001497 A1   Jan. 6, 2022

Related U.S. Application Data

(63) Continuation of application No. 15/465,384, filed on Mar. 21, 2017, now Pat. No. 11,072,043.
(Continued)

(51) Int. Cl.
*B23K 31/12* (2006.01)
*B22F 10/28* (2021.01)
(Continued)

(52) U.S. Cl.
CPC ............ *B23K 31/125* (2013.01); *B22F 10/28* (2021.01); *B22F 10/366* (2021.01); *B22F 10/38* (2021.01);
(Continued)

(58) Field of Classification Search
CPC ........... B22F 2003/1057; B22F 3/1055; B23K 26/034; B23K 26/342; B23K 31/125;
(Continued)

(56) References Cited

U.S. PATENT DOCUMENTS 5,427,733 A   6/1995   Benda et al.
6,690,016 B1  2/2004   Watkins et al.
(Continued)

FOREIGN PATENT DOCUMENTS

DE   102015011013 A1   2/2016
EP       3070554 B1     2/2018
(Continued)

OTHER PUBLICATIONS

Clijsters, et al., "In Situ Quality Control of the Selective Laser Melting Process Using a High-speed, Real-time Melt Pool Monitoring System", The International Journal of Advanced Manufacturing Technology, vol. 75, No. 5-8, Aug. 10, 2014, pp. 1089-1101.
(Continued)

*Primary Examiner* — Dana Ross
*Assistant Examiner* — James F Sims, III
(74) *Attorney, Agent, or Firm* — FisherBroyles, LLP

(57) ABSTRACT

The disclosed embodiments relate to the monitoring and control of additive manufacturing. In particular, a method is shown for removing errors inherent in thermal measurement equipment so that the presence of errors in a product build operation can be identified and acted upon with greater precision. Instead of monitoring a grid of discrete locations on the build plane with a temperature sensor, the intensity, duration and in some cases position of each scan is recorded in order to characterize one or more build operations.

17 Claims, 15 Drawing Sheets

Related U.S. Application Data

(60) Provisional application No. 62/311,318, filed on Mar. 21, 2016.

(51) Int. Cl.

| | | |
|---|---|---|
| *B22F 10/31* | (2021.01) | |
| *B22F 10/366* | (2021.01) | |
| *B22F 10/38* | (2021.01) | |
| *B22F 12/41* | (2021.01) | |
| *B22F 12/49* | (2021.01) | |
| *B22F 12/90* | (2021.01) | |
| *B23K 26/03* | (2006.01) | |
| *B23K 26/342* | (2014.01) | |
| *B33Y 10/00* | (2015.01) | |
| *B33Y 50/02* | (2015.01) | |
| *B41M 5/26* | (2006.01) | |
| *G01J 5/00* | (2022.01) | |
| *G01J 5/04* | (2006.01) | |
| *G01J 5/07* | (2022.01) | |
| *G01J 5/48* | (2022.01) | |
| *G01J 5/80* | (2022.01) | |
| *G01K 11/00* | (2006.01) | |
| *G01N 25/72* | (2006.01) | |

(52) U.S. Cl.
CPC .............. *B22F 12/41* (2021.01); *B22F 12/90* (2021.01); *B23K 26/034* (2013.01); *B23K 26/342* (2015.10); *B33Y 10/00* (2014.12); *B33Y 50/02* (2014.12); *B41M 5/262* (2013.01); *G01J 5/04* (2013.01); *G01J 5/07* (2022.01); *G01K 11/00* (2013.01); *G01N 25/72* (2013.01); *B22F 10/31* (2021.01); *B22F 12/49* (2021.01); *G01J 2005/0077* (2013.01); *G01J 5/48* (2013.01); *G01J 5/80* (2022.01); *Y02P 10/25* (2015.11)

(58) Field of Classification Search
CPC ........ B33Y 10/00; B33Y 50/02; B41M 5/262; G01J 2005/0048; G01J 2005/0077; G01J 2005/0081; G01J 5/04; G01J 5/089; G01K 11/00; G01N 25/72; Y02P 10/295

USPC ...................................................... 219/76.1
See application file for complete search history.

(56) References Cited

U.S. PATENT DOCUMENTS

| | | |
|---|---|---|
| 9,977,425 B1 | 5/2018 | McCann et al. |
| 10,254,754 B2 | 4/2019 | McCann et al. |
| 10,705,509 B2 | 7/2020 | Snyder et al. |
| 10,725,459 B2 | 7/2020 | Good et al. |
| 2009/0206065 A1 | 8/2009 | Kruth et al. |
| 2010/0174392 A1 | 7/2010 | Fink et al. |
| 2011/0001812 A1 | 1/2011 | Kang et al. |
| 2013/0169956 A1 | 7/2013 | Cano Cediel et al. |
| 2013/0305357 A1 | 11/2013 | Ayyagari et al. |
| 2014/0265046 A1 | 9/2014 | Burris et al. |
| 2015/0170501 A1 | 6/2015 | Mukherji et al. |
| 2015/0321422 A1 | 11/2015 | Boyer |
| 2016/0184893 A1 | 6/2016 | Dave et al. |
| 2016/0193696 A1* | 7/2016 | McFarland ............ B22F 10/34 219/76.12 |
| 2016/0302148 A1 | 10/2016 | Buck et al. |
| 2017/0266762 A1 | 9/2017 | Dave et al. |
| 2018/0200004 A1 | 7/2018 | Carnes et al. |

FOREIGN PATENT DOCUMENTS

| | | |
|---|---|---|
| WO | 2014144255 A2 | 9/2014 |
| WO | 2015169309 A1 | 11/2015 |
| WO | 2017165436 A1 | 9/2017 |

OTHER PUBLICATIONS

EP17771003.5, "Extended European Search Report", Oct. 9, 2019, 11 pages.

PCT/US2017/023439, "International Preliminary Report on Patentability", Oct. 4, 2018, 9 pages.

PCT/US2017/023439, "International Search Report and Written Opinion", Jun. 16, 2017, 11 pages.

EP17771003.5, "Intention to Grant", Apr. 25, 2023, 9 pages.

\* cited by examiner

LAYER-BASED DEFECT DETECTION USING NORMALIZED SENSOR DATA

CROSS-REFERENCE TO RELATED APPLICATIONS

This application is a continuation of U.S. patent application Ser. No. 15/465,384, filed Mar. 21, 2017; which claims priority under 35 U.S.C. 119(e) to U.S. Provisional Patent Application No. 62/311,318, filed on Mar. 21, 2016, the disclosures of which are hereby incorporated by reference in their entirety and for all purposes.

BACKGROUND OF THE INVENTION

Additive manufacturing, or the sequential assembly or construction of a part through the combination of material addition and applied energy, takes on many forms and currently exists in many specific implementations and embodiments. Additive manufacturing can be carried out by using any of a number of various processes that involve the formation of a three dimensional part of virtually any shape. The various processes have in common the sintering, curing or melting of liquid, powdered or granular raw material, layer by layer using ultraviolet light, high powered laser, or electron beam, respectively. Unfortunately, established processes for determining a quality of a resulting part manufactured in this way are limited. Conventional quality assurance testing generally involves destruction of the part. While destructive testing is an accepted way of validating a part's quality, as it allows for close scrutiny of various internal portions of the part, such tests cannot for obvious reasons be applied to a production part. Consequently, ways of non-destructively verifying the integrity of a part produced by additive manufacturing is desired.

One particular problem with characterizing the quality of the resulting part is that data collected by a wide area thermal sensor offset from an additive manufacturing build plane can be artificially biased by a varying distance between the thermal sensor and different portions of the build plane.

SUMMARY OF THE INVENTION

Embodiments of the present invention are related to a large subcategory of additive manufacturing, which involves using an energy source that takes the form of a moving region of intense thermal energy. In the event that this thermal energy causes physical melting of the added material, then these processes are known broadly as welding processes. In welding processes, the material, which is incrementally and sequentially added, is melted by the energy source in a manner similar to a fusion weld.

When the added material takes the form of layers of powder, after each incremental layer of powder material is sequentially added to the part being constructed, the heat source melts the incrementally added powder by welding regions of the powder layer creating a moving molten region, hereinafter referred to as the weld pool, so that upon solidification they become part of the previously sequentially added and melted and solidified layers below the new layer that includes the part being constructed. As additive machining processes can be lengthy and include any number of passes of the weld pool, it can be difficult to avoid at least slight variations in the size and temperature of the weld pool as the weld pool is used to solidify the part. It should be noted that additive manufacturing processes are typically driven by one or more processors associated with a computer numerical control (CNC) due to the high rates of travel of the heating element and complex patterns needed to form a three dimensional structure.

In addition to applying to additive manufacturing operations, the describe method and apparatus can also be relevant to identifying and characterizing defects in laser marking operations.

An additive manufacturing method is disclosed that includes the following: monitoring a heat source scanning across a powder bed using an optical temperature sensor; scanning across different portions of the powder bed with the heat source to produce a metal part; recording the intensity and duration of scans made by the heat source; generating a characteristic curve from the optical temperature sensor for one or more regions of the metal part using the recorded scan duration and intensity data; comparing the characteristic curve of each region with a baseline characteristic curve associated with the respective region; and determining one of the regions is defective when the comparing shows a difference between the characteristic curve of the region and the baseline characteristic curve that exceeds a predetermined threshold.

A manufacturing method is disclosed that includes the following: identifying one or more regions within a part where defects are more likely to occur during the manufacturing method; recording sensor data from laser scans made within the identified one or more regions using an optical temperature sensor; generating a characteristic curve for each of the one or more regions using the sensor data collected for each of the recorded laser scans; comparing the characteristic curves to corresponding a baseline characteristic curves; and determining one or more of the regions is defective when the comparing shows a difference between the characteristic curve of the region and the baseline characteristic curve that exceeds a predetermined threshold.

Another additive manufacturing method is disclosed that includes the following: creating a metal part on a powder bed using a scanning laser; recording sensor data for scans made by the laser in select regions of the metal part using an optical temperature sensor; determining intensity and duration of each of the recorded scans; creating a characteristic curve for each of the regions of the metal part based on the intensity and duration of each scan associated with the region; comparing each of the characteristic curves to a baseline characteristic curve associated with each of the regions; and determining based on the comparing whether any of the regions are likely to have manufacturing defects.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION OF SPECIFIC EMBODIMENTS

Figure 1:
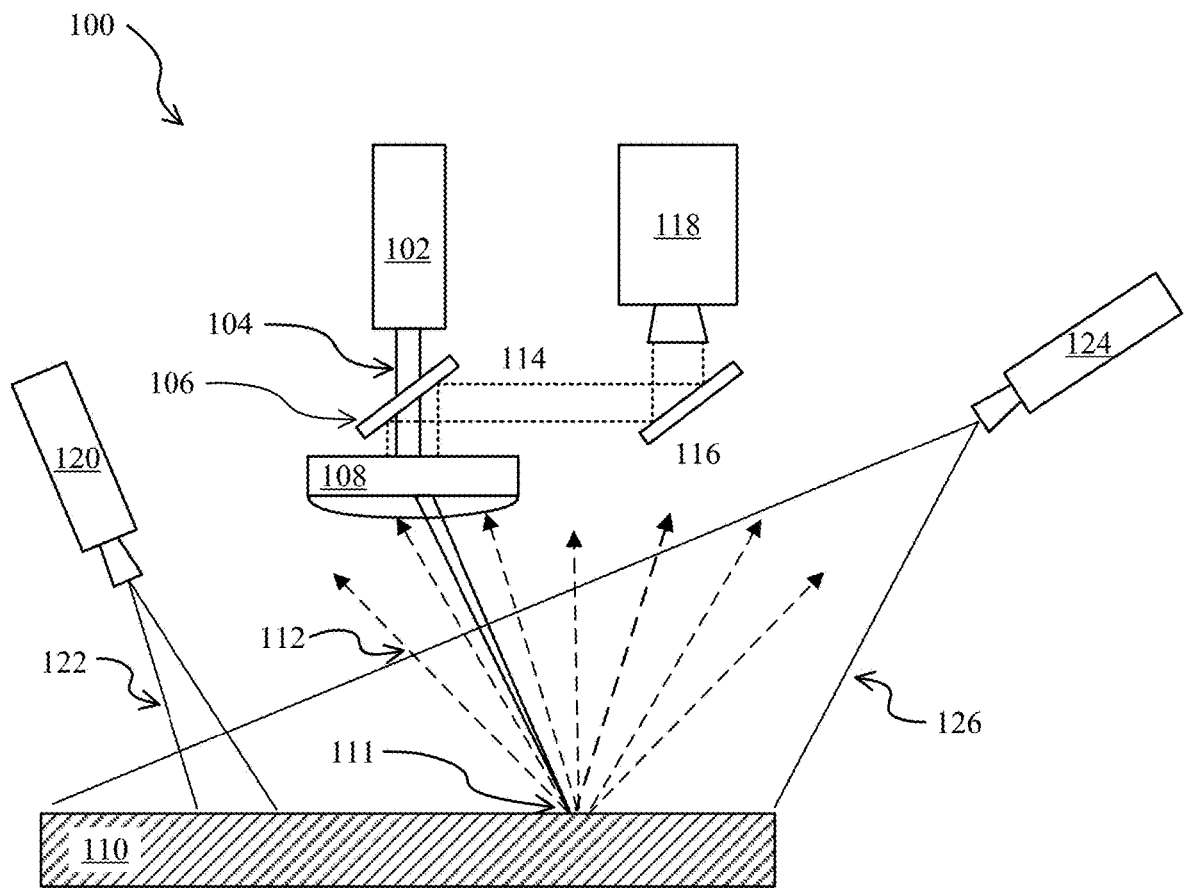
FIG. 1 shows an exemplary additive manufacturing configuration suitable for use with the described embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Photodiode (PD) sensors can be configured to measure the intensity of radiated heat. While a PD sensor can be designed with a wide field of view that has the advantage of being able to detect heat being emitted from anywhere across a large area, the PD sensor is not generally able to determine from which portion of the field of view the radiated heat originated. Additionally, the amount of radiated heat detected by the PD sensor is reduced commensurate with the distance the PD sensor is from the source of the heat.

The inability of the PD sensor to be able to distinguish position coupled with the distance related variations in the detected signals makes carrying out any reliable temperature characterization of a moving heat source problematic without the benefit of additional data sources. For example, if a PD sensor had two portions of an object within its field of view that were sequentially heated to the same temperature but a first portion of the object was substantially closer to the PD sensor than a second portion, the readings of the PD sensor would indicate that the temperature reached by the first portion was higher than the temperature reached by the second portion. Consequently, any substantial geometric variations in the areas in the field of view of the PD sensor can contain inherent errors.

One solution to this problem is to add one or more additional sensors configured to track the location of the heat source so that the distance of the heat source from the PD sensor can be accounted for. For example, an imaging sensor could be configured to track the position of the heat source. In cases where the heat source travels at high speeds, a high frame rate imaging sensor could be required to effectively track the heat source. By syncing the position of the heat source with respect to the PD sensor with the temperature data provided by the PD sensor, the PD sensor data could be corrected for variations caused by distance.

The aforementioned PD sensor can be used to monitor radiated heat in an additive manufacturing operation. In some additive manufacturing operations the heat source can take the form of a laser scanning rapidly across a powder bed. This type of moving heat source is problematic for a PD sensor to monitor on account of the aforementioned intensity variations caused by the heat source operating at varying distances from the PD sensor. In addition to the distance problems other systematic sources of error include errors generated by varying scan lengths of the laser and varying directions of travel of the laser. Longer scans tend to raise the temperature of the powder bed more than shorter scans, causing longer laser scans to appear to reach higher temperatures than shorter scan lengths. The direction of travel of the laser can also have an effect on detected intensity on account of powder accumulating in front of and obscuring some of the heat being generated by the laser from the PD sensor.

One way to overcome the systematic errors inherent with using a PD sensor to monitor the temperature of a powder bed during an additive manufacturing operation is to create a baseline set of data corrected for scan length and distance variations that can then be used to confirm the quality of other layers. While the scan length variation is generally the largest source of intensity variation, unlike the distance variations it can be characterized by the PD sensor. This is because the heat introduced by the laser in an additive manufacturing operation is substantially hotter than any other source of heat on the build plane, so the PD sensor can be configured to monitor laser scan start and stop times to determine a duration for each detected laser scan. The length/duration of each scan can then be stored and associated with a corresponding scan.

The baseline can be created by: (1) normalizing the PD signal intensity data by plotting PD signal intensity vs scan length for one or more layers of an additive manufacturing operation; (2) making a best fit line through the raw PD signal intensity data; (3) applying a transform to the data that flattens the best fit line thereby normalizing the raw data to account for scan length variation; (4) separating the normalized PD signal intensity data into multiple bins, where each bin has scans of similar length; (4) ranking the scans in each bin by intensity to produce a curve indicative of the amount of variation due to distance; and (5) averaging the curves generated from each bin together to generate a baseline characteristic curve. Ideally, when monitoring production of the layer associated with the baseline characteristic curve some additional checks should be performed to confirm satisfactory performance of the additive manufacturing process while generating the layer. These process checks could include destructive testing of the resulting part. The threshold at which a part can be considered to be defective can vary based on the type of part, the material being used with the part and various other factors. The newly created baseline characteristic curve can be valid for use during the production of a wide variety of parts as long as the powder properties, laser scan speed, scan pattern and power are kept consistent.

The baseline characteristic curve can then be compared with curves created while producing production parts. In the same way that the baseline characteristic curve is produced, a characteristic curve can be produced for each layer of a production part. The baseline characteristic curve can then be compared with the characteristic curves associated with each layer and then any characteristic curves which are too different from the baseline characteristic curve can be flagged as potentially containing a defect.

In some embodiments, the characteristic curves can be calibrated by a narrow field of view sensor configured to identify performance related parameters within the narrow field of view, such as for example, peak temperature, heating rate and cooling rate. These performance related parameters can then be correlated with the characteristic curves to help quantify the otherwise uncalibrated characteristic curve comparison.

These and other embodiments are discussed below with reference to FIGS. 1-10; however, those skilled in the art will readily appreciate that the detailed description given herein with respect to these figures is for explanatory purposes only and should not be construed as limiting.

FIG. 1 shows an exemplary additive manufacturing system 100 suitable for use with the described embodiments. An intense heat source 102 is in this specific instance taken to be a laser. The beam 104 emitted by heat source 102 originates at the laser head and passes through a partially reflective optic 106. This optic 106 is designed to be essentially fully transmissive at the specific wavelength that the laser operates, and reflective at other optical wavelengths. Generally the laser wavelength will be infrared or near-infrared, or typically wavelengths of 1000 nm or greater. The laser can include a scanning head 108 that consists of x and y positioning galvanometers as well as a focus lens, such as an f-theta lens. The beam 104 is therefore focused and strikes powder distributed across build plane 110 at a given location 111 thus generating a molten region of liquefied powder at location 111. The molten region of liquefied powder emits optical radiation 112 isotropically and uniformly over a large solid angle. Some of this optical radiation 112 will make its way back through the scanning head 108 and is reflected by the partially reflective optic 106.

This reflected optical beam 114 then makes its way through one or more analytical instruments. As depicted, mirror 116 sends the reflected optical beam 114 to photodiode 118. In some embodiments mirror 116 can be only partially reflective, allowing it to act as a beam splitter that sends a portion of reflected optical beam 114 to one or more other sensors. Photodiode 118 can be capable of sensing a range of frequencies at a high enough speed and recording rate to detect possible anomalies occurring during an additive manufacturing process, i.e. sudden departures from an average or mean intensity level. Because photodiode 118 has a relatively low resolution it can be configured to record data at extremely high frame rates, so that photodiode 218 is capable of detecting very transient temperature excursions occurring during a build process.

In addition to the aforementioned Lagrangian reference frame photodiode 118, another aspect of the depicted sensor system is the existence of at least one or more sensors configured to collect measurements made in an Eulerian reference frame and are completely independent of the Lagrangian reference frame. These Eulerian measurements can be used for correlation, calibration and characterization purposes. For example in FIG. 1, a stationary pyrometer 120 in the Eulerian reference frame independently measures the temperature of a small region of build plane 110 and can therefore provide a calibration to the measurements made by the Lagrangian photodiode 118. The field of view 122 of the stationary Eulerian pyrometer 120 is suitably chosen so that it matches the characteristic dimension of the molten zone existing on build plane 110 and made by the focused laser beam 104 at the specific location 111 to which the scanning head 108 displaced and focused the beam 104.

FIG. 1 also shows thermal sensor 124 having a field of view 126, which can be configured to detect temperature changes in substantially any portion of the top surface of build plane 110. In some embodiments, thermal sensor 124 can take the form of a photodiode and pyrometer 120 can be configured to provide calibration information to Eulerian photodiode 124, thereby allowing the voltages generated by Eulerian photodiode 124 to be converted to temperatures that accurately distinguish the temperature of any point on the top surface of a part being formed on build plane 110.

Figure 2A:
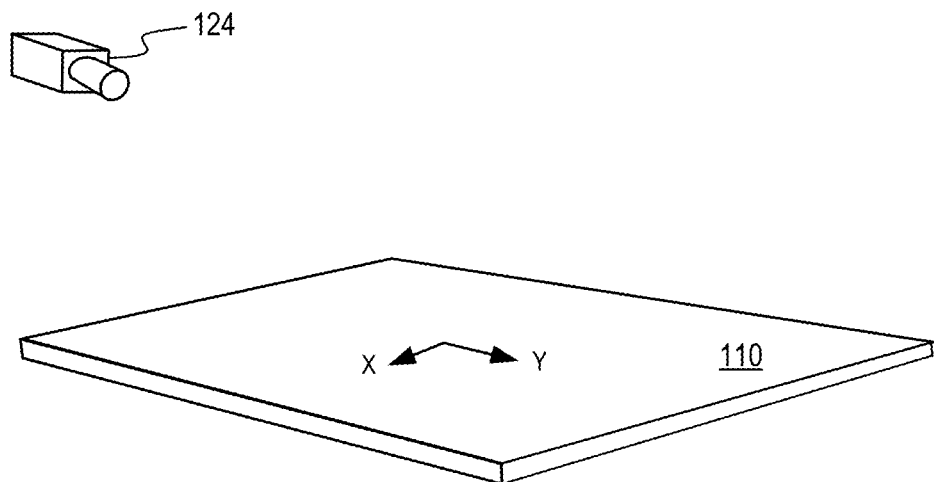
FIG. 2A shows a simplified perspective view of a thermal sensor positioned with respect to a surface of a build plane.

FIG. 2A shows a simplified perspective view of thermal sensor 124 positioned with respect to an entire surface of build plane 110. Thermal sensor 124 is offset from build plane 110 so that the distance between thermal sensor 124 and various portions of build plane 110 varies substantially. An x-y coordinate system is also depicted showing how positions across build plane 110 can be measured.

Figure 2B:
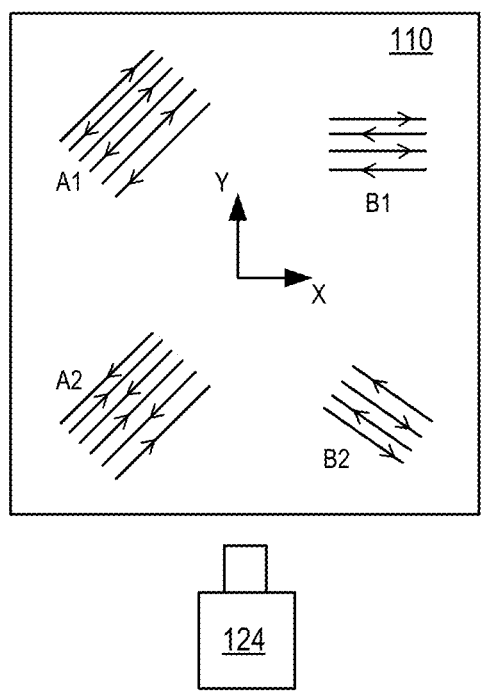
FIG. 2B shows a top view of the build plane depicted in FIG. 2A and how different portions of the build plane can be subject to laser scans of varying length and orientation'

FIG. 2B shows a top view of build plane 110 and how a scan strategy for a given part can employ scan patterns with scan lines oriented in different directions and having different lengths. This results in different regions of build plane 110 being subject to laser scans of varying length and orientation. In this depiction, laser scan patterns A1 and A2 have substantially the same scan length and laser scans B1 and B2 have substantially the same scan length. Because the duration of the scans has a substantial impact upon the amount of energy reflected into photodiode 124, calibration steps can be more accurately performed by comparing laser scans of similar length. Scan patterns A1 and A2 would likely be grouped together, but since scan pattern A1 is substantially farther than scan pattern A2 is from thermal sensor 124, a detected intensity of scans associated with scan pattern A1 can be substantially less than a detected intensity of scans associated with scan pattern A2. Scan pattern B1 and B2 could also be grouped together by scan length but are also substantially different distances from sensor 124. However, in addition to being farther away, scan pattern B1 also has a different orientation than scan pattern B2. While the difference in orientation of the scan patterns will generally cause variations in individual scan intensities, these differences can generally be averaged out when the scan patterns are arranged in alternating, opposite directions, as depicted. For this reason, differences in intensity caused by scan orientation can be largely overlooked when looking at the scans as a group.

Figure 3:
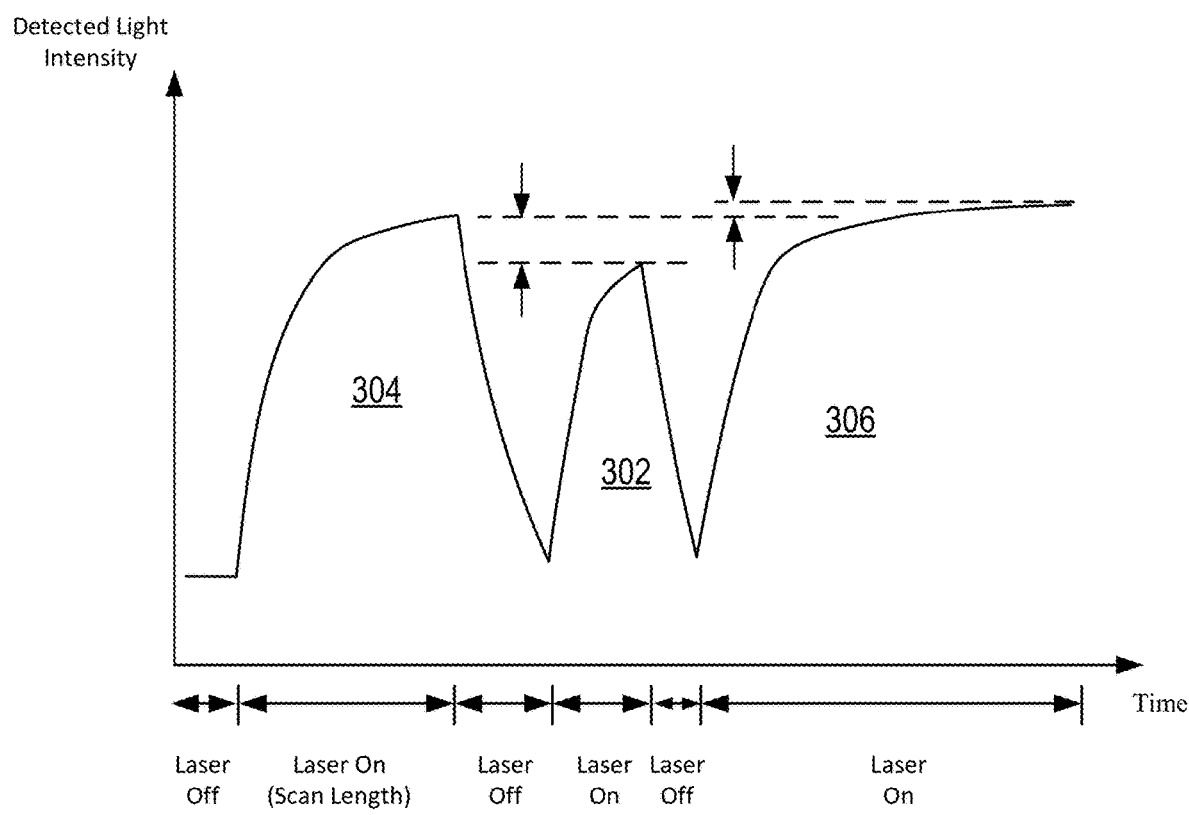
FIG. 3 shows a graph plotting the intensity and duration of multiple sequential laser scans of different duration.

FIG. 3 shows a graph plotting the intensity and duration of multiple sequential laser scans of different duration. Power output of the laser is maintained at the same setting for each of the laser scans. The graph shows how the intensity of light emitted for any given laser varies substantially as a function of scan length. It should be noted that after a particular scan duration, intensity increases more slowly as the heat of the portions of the powder bed surrounding the melt pool (the melt pool represents that portion of the powder on the powder bed that is liquefied as the laser scans across the powder bed) reaches a steady state. As depicted, short scan 202 reaches a substantially smaller intensity than medium length scan 204, while longer length scan 206 attains only a marginally higher maximum intensity than medium length scan 204.

A. Characteristic Curve Creation and Comparison

Figure 4A:
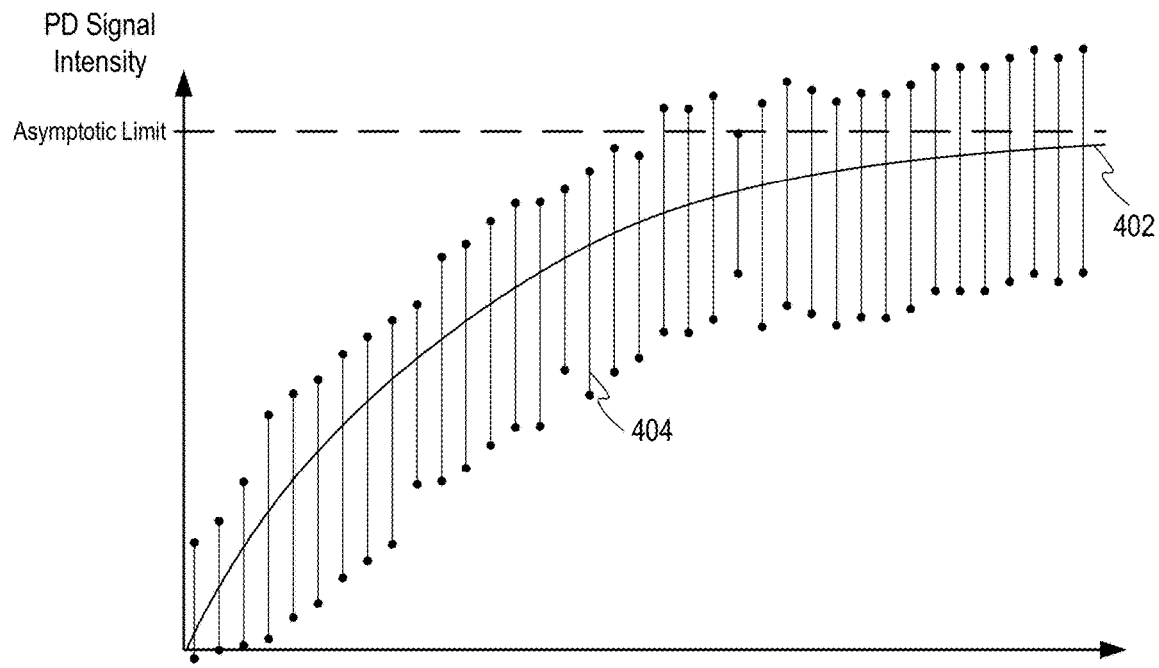
FIGS. 4A-4F show how data points collected by a thermal sensor can be corrected to remove variations caused by differences in scan length and distance to generate a characteristic curve indicative of intensity variation as a function of distance.

FIGS. 4A-4F show how data points collected by a thermal sensor can be corrected to remove variations caused by differences in scan length and distance to generate a characteristic curve indicative of intensity variation as a function of distance. FIG. 4A shows a graph representing all the scans detected while building one layer of a part. Trend line 402 shows the average intensity for each scan length and how the detected intensity increases rapidly when the laser or heat source first contacts the powder bed and then increases more slowly as the signal intensity approaches an asymptotic limit, which is not exceeded by the trend line. The trend line can be represented by the following equation, where $y'_{PD}$ is the fitted photodiode signal, $y_{PD}$ is the raw intensity data and $x_{SL}$ is the scan length:

$$y'_{PD} = f(x_{SL}) \quad \text{Eq(1)}$$

FIG. 4A also depicts a number of variance bars 404 that indicate the range of values for a particular scan length or narrow range of scan lengths. In some embodiments, the range can omit a top and bottom portion of the range, such as for example, the top and bottom 5% to omit any extreme outlying data points, which could skew the interpretation of the representation. The variation of the data from trend line 402 can be attributed to variations caused by certain laser scans being different distances from a thermal sensor measuring the laser scans. Some variations can also be due to the laser scans being aligned in different directions. Different directions and distances of the laser scan with respect to the thermal sensor can both result in varying amounts of radiation reaching the thermal sensor.

Figure 4B:
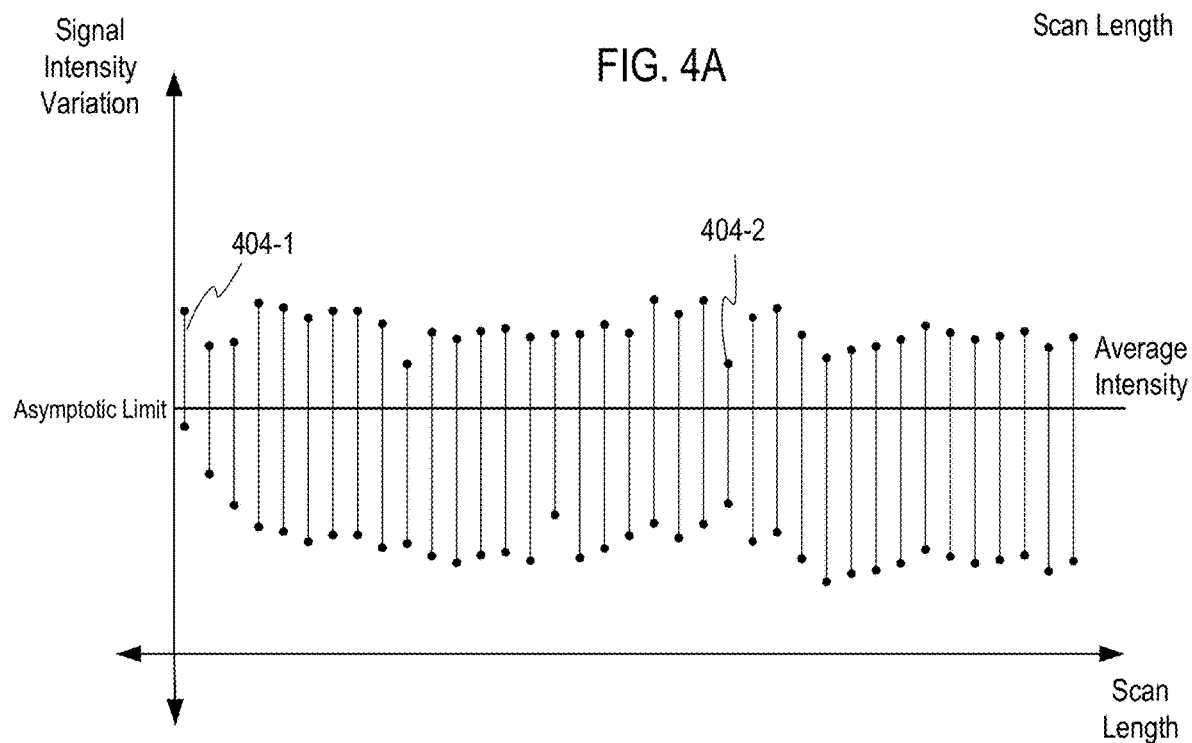

FIG. 4B shows a graph representing a normalized version of the data depicted in FIG. 4A. Instead of representing the raw sensor intensity as in FIG. 4A, the graph now represents signal intensity variation above and below a selected value. In this case, the asymptotic limit is chosen as the value to which the average intensity of each average scan length will be set. The graph can be normalized by using the following equation, where $y_{AL}$ is the asymptotic limit:

$$y^*_{PD} = y_{PD} - y'_{PD} + y_{AL} \quad \text{Eq(2)}$$

In this way, the intensity variations of each scan length can be directly comparable. While there are obvious differences in some scan lengths, in general the intensity variation is very similar. In some cases, such as for example represented by variance bars 404-1 and 404-2 the range is substantially different. These differences can be due to scans of a particular length being more tightly grouped. For example, when a majority of the scans of a particular duration are localized in one portion of the build plane, the variation in intensity becomes substantially less than scan lengths that are more widely spread across the build plane on account of there being less distance variation when the scans are more localized.

Figure 4C:
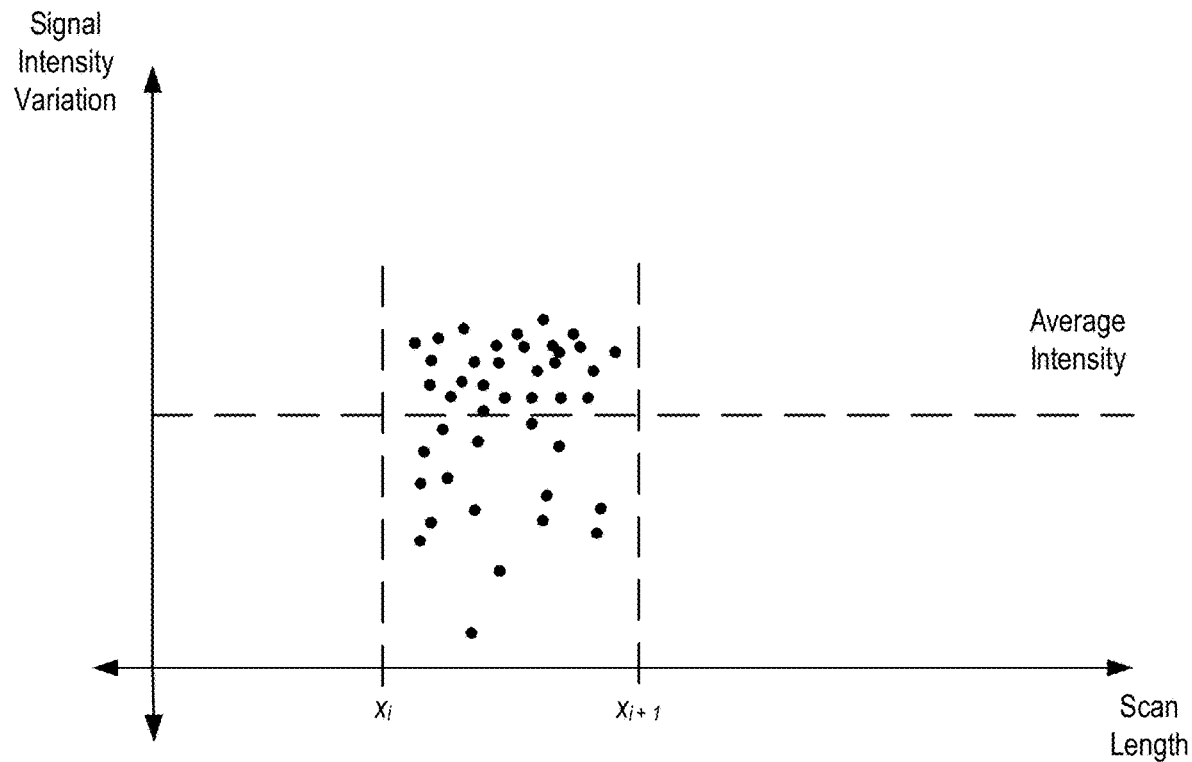

FIG. 4C shows data points for a narrow range of scan lengths $x_i$ to $x_{i+1}$ that can correspond to one of variance bars 404 depicted in FIGS. 4A and 4B. Each one of these narrow ranges can be classified into its own bin. A size of the range can vary based on the total number of data points, size of the build plane and other factors. In general, each of these bins can have the same range.

Figure 4D:
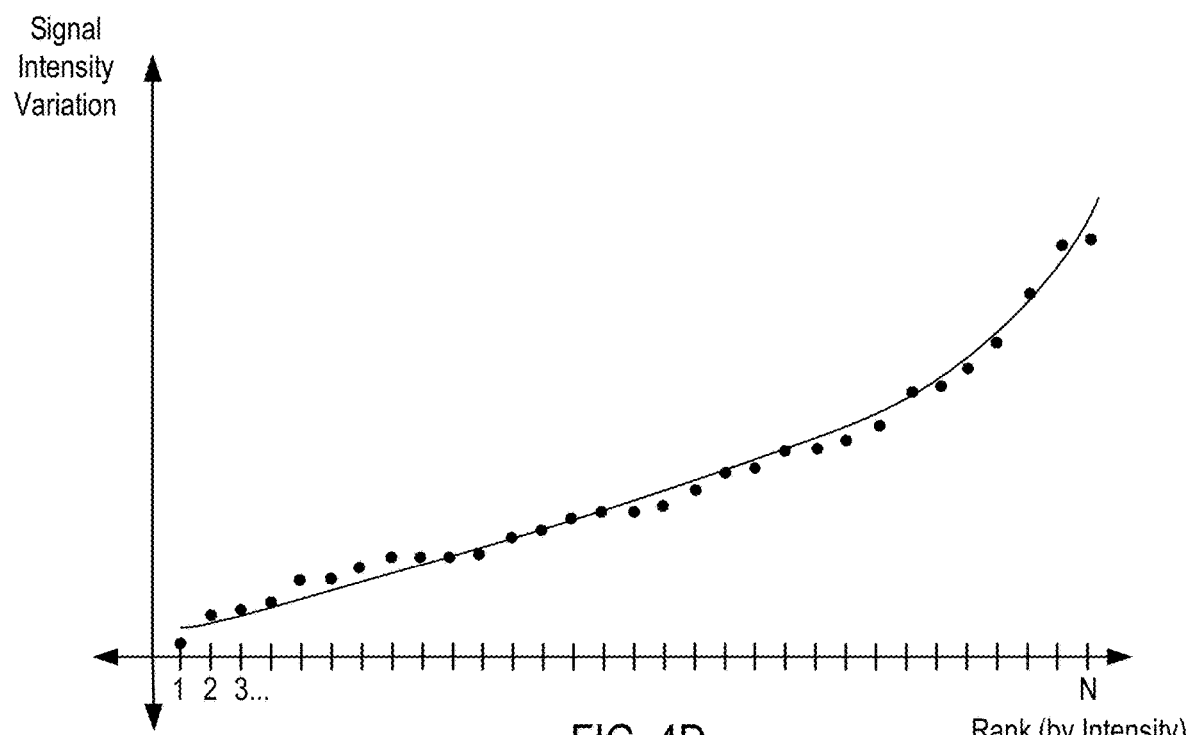

FIG. 4D shows the data points of an exemplary bin ordered by intensity. By ordering the points in this manner, the resulting curve represents the intensity change across the length of the build plane. While a single bin provides one representation of intensity variation with respect to distance, it should be appreciated that depending on the distribution of the scans a single bin could provide a misleading representation. Consequently, a combination of curves from each bin provides a better overall representation of distance variation effect on intensity. However, since each bin doesn't necessarily contain the same number of points, the rank numbers of each bin can be normalized to a desired value, such as for example 1.

Figure 4E:
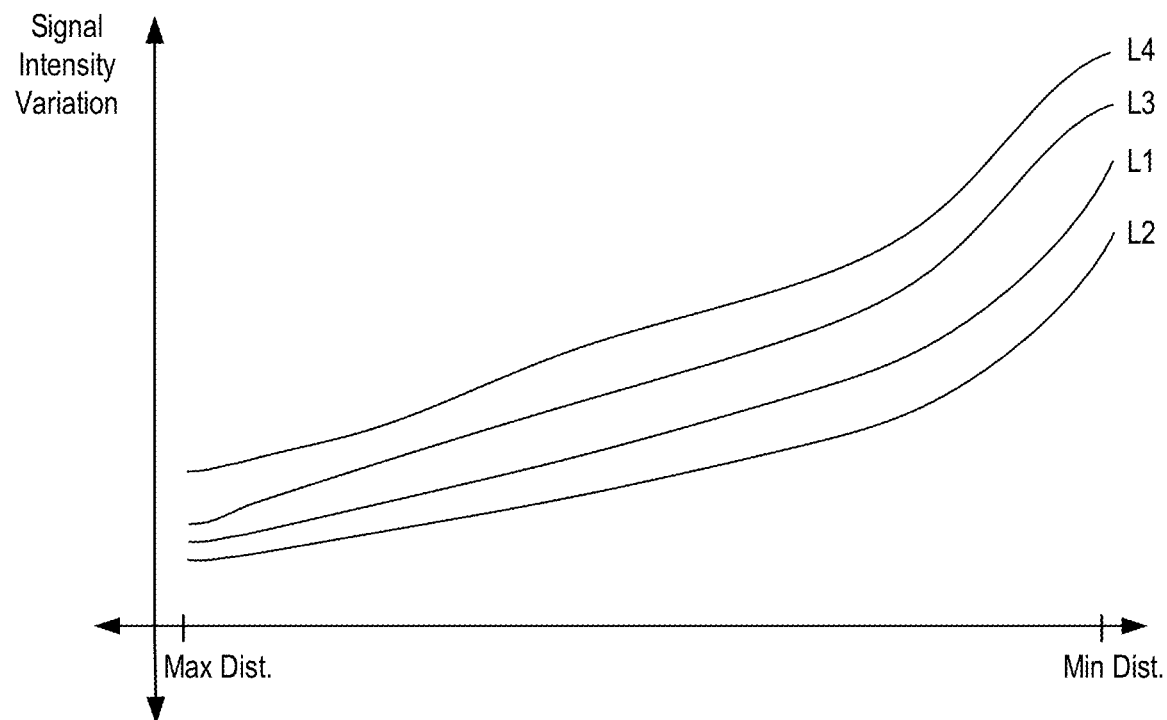
Figure 4F:
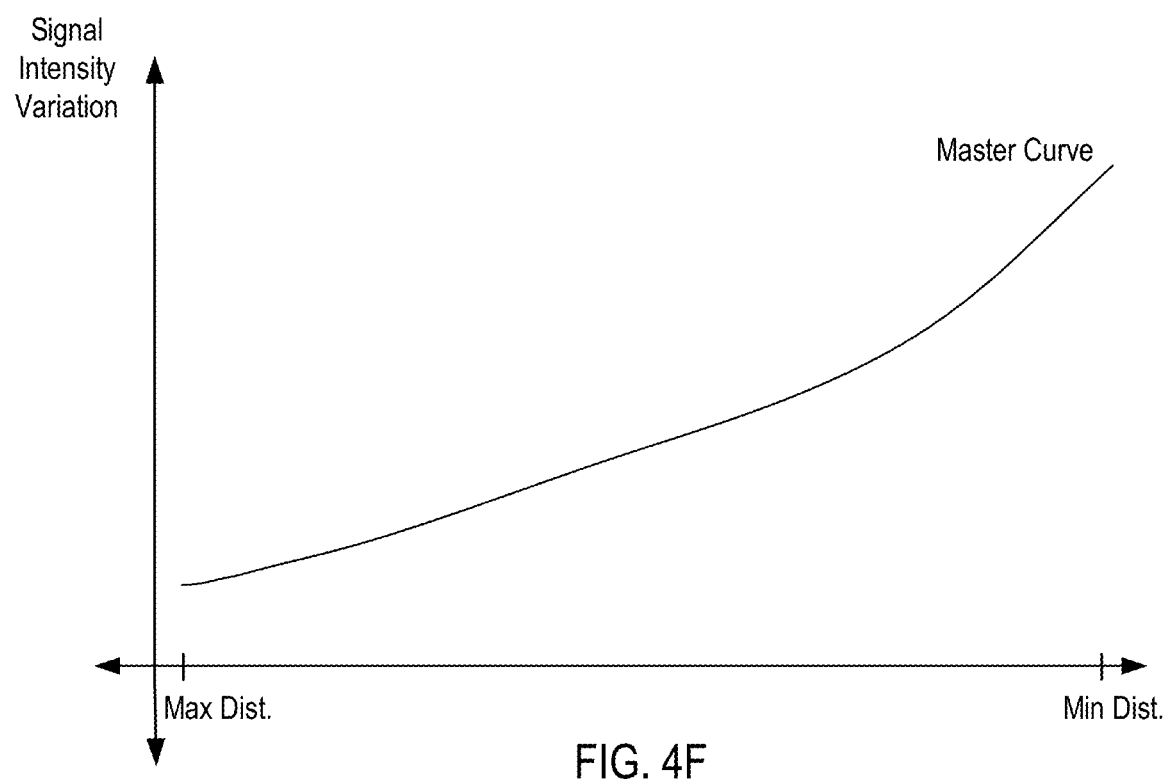

FIG. 4E shows a number of bin curves arranged on the same graph, represented by scan lengths L1, L2, L3 and L4. It should be noted that because the highest intensities are assumed to be closest to the sensor, the x-axis actually decreases in distance from the sensor. Furthermore, the x-axis values are normalized so that for each bin the lowest intensity value corresponds to maximum distance and the highest intensity value corresponds to minimum distance. In FIG. 4F the trend lines or data points are all averaged together to produce a characteristic curve for the layer associated with the scans.

Figure 5A:
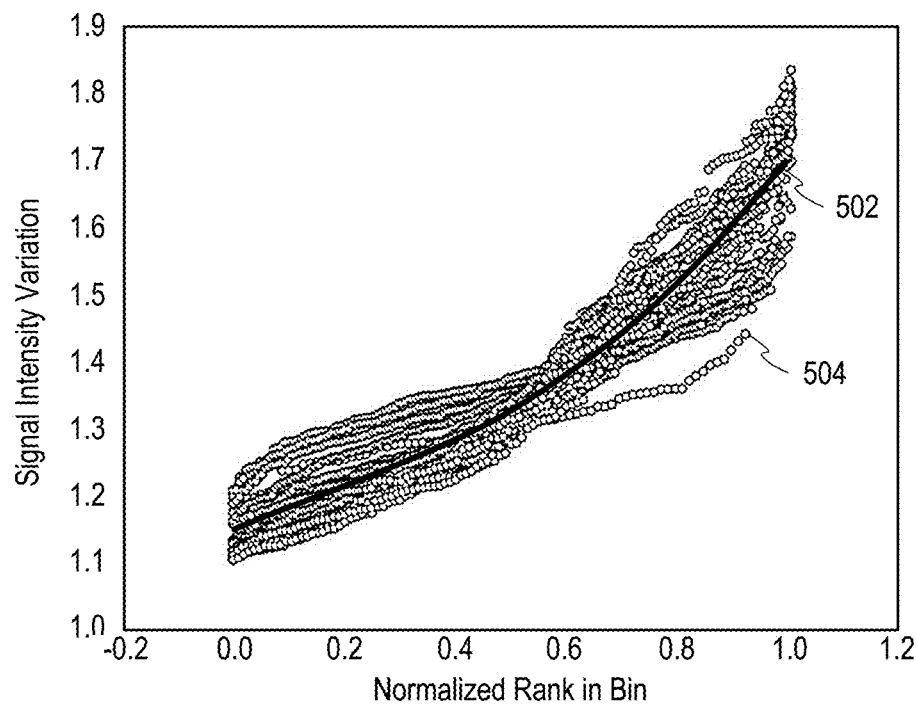
FIGS. 5A-5C each shows a graph representing experimental data collected for a layer and normalized in accordance with the description provided in conjunction with FIGS. 4A-4F.
Figure 5B:
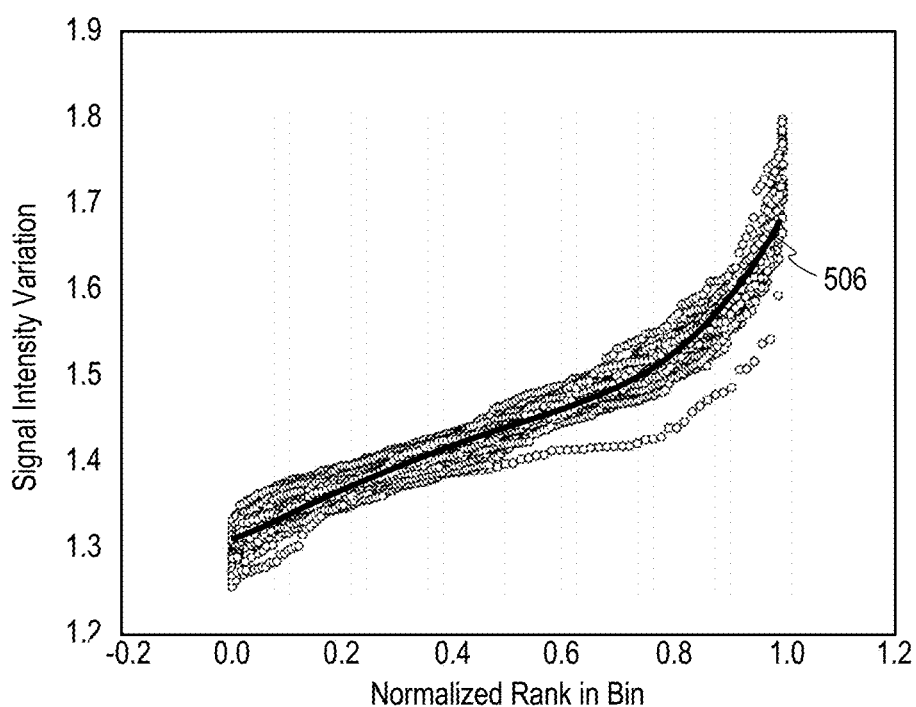

FIGS. 5A-5B each shows a graph representing experimental data collected for a layer and normalized in accordance with the description provided in conjunction with FIGS. 4A-4F. Consequently, trend line 502 of FIG. 5A is equivalent to the characteristic curve depicted in FIG. 4F. FIG. 5, however, also shows the data points 504 making up each of the bin curves, that get averaged together to define trend line 502.

FIG. 5B shows a similar graph in which scan speed of the laser while making the layer was increased by about 10-15%. As can be seen the curves while not entirely different do have a somewhat different shape and point data point distribution. When trend line 502 represents a known good additive manufacturing operation the difference in curvature and signal intensity variation between trend lines 502 and 506 clearly shows the presence of a systematic problem with the layer of the part associated with the data in FIG. 5B.

Figure 5C:
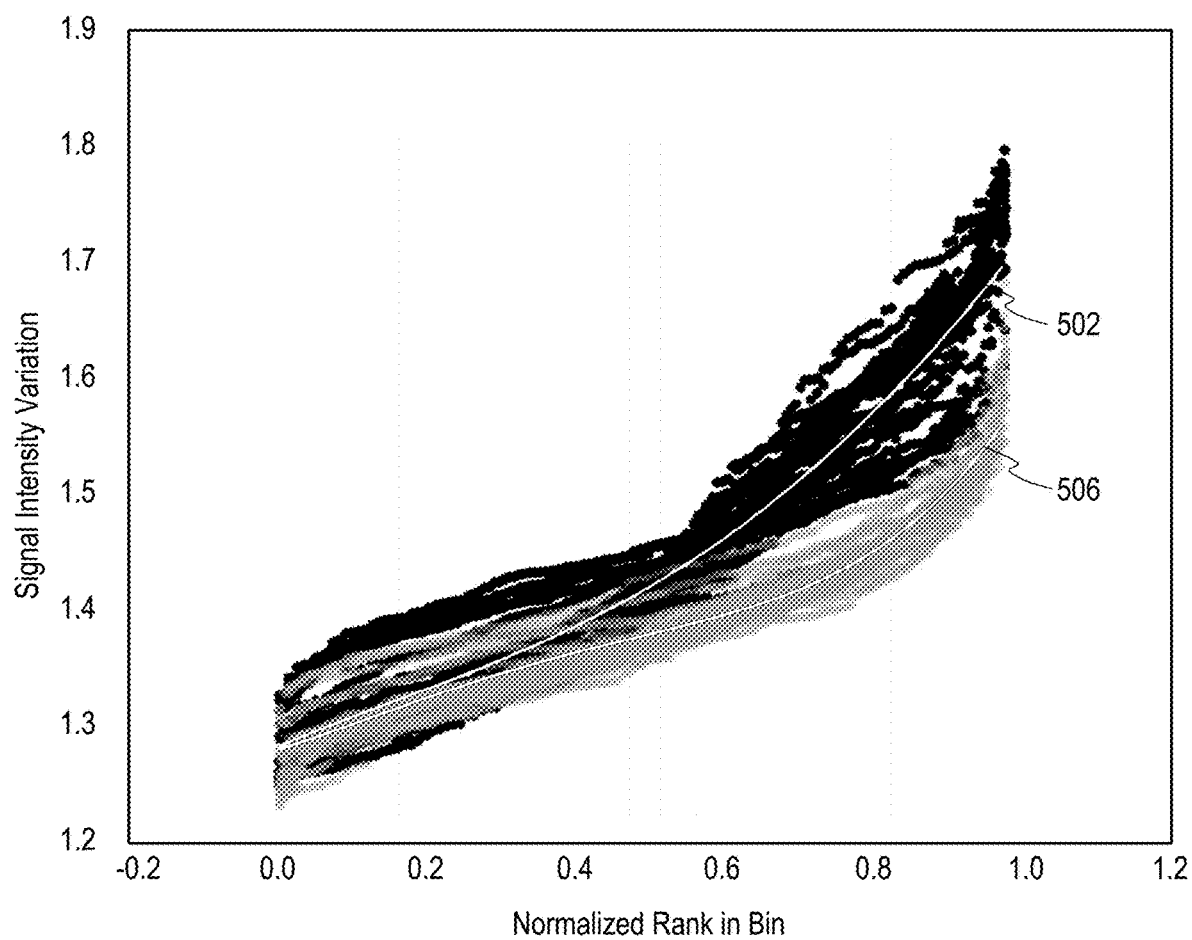

FIG. 5C shows the two trend lines and data superimposed upon one another. The black data points correspond to trend line 502 and the gray data points correspond to trend line 506. In order to clearly compare the intensity variation the intensity variation values for trend line 506 and its associated data points have been lowered to coincide with trend line 502. In this way it can be clearly seen that there is substantially less variation in intensity for trend line 502 than there is for trend line 506. This lower intensity variation can be due to the higher scan speed resulting in shorter duration scans, which reduces the overall amount of heat input into the product build. With the lower heat input the thermal sensor ends up seeing a lower amount of variation when viewing the build plane.

Figure 6:
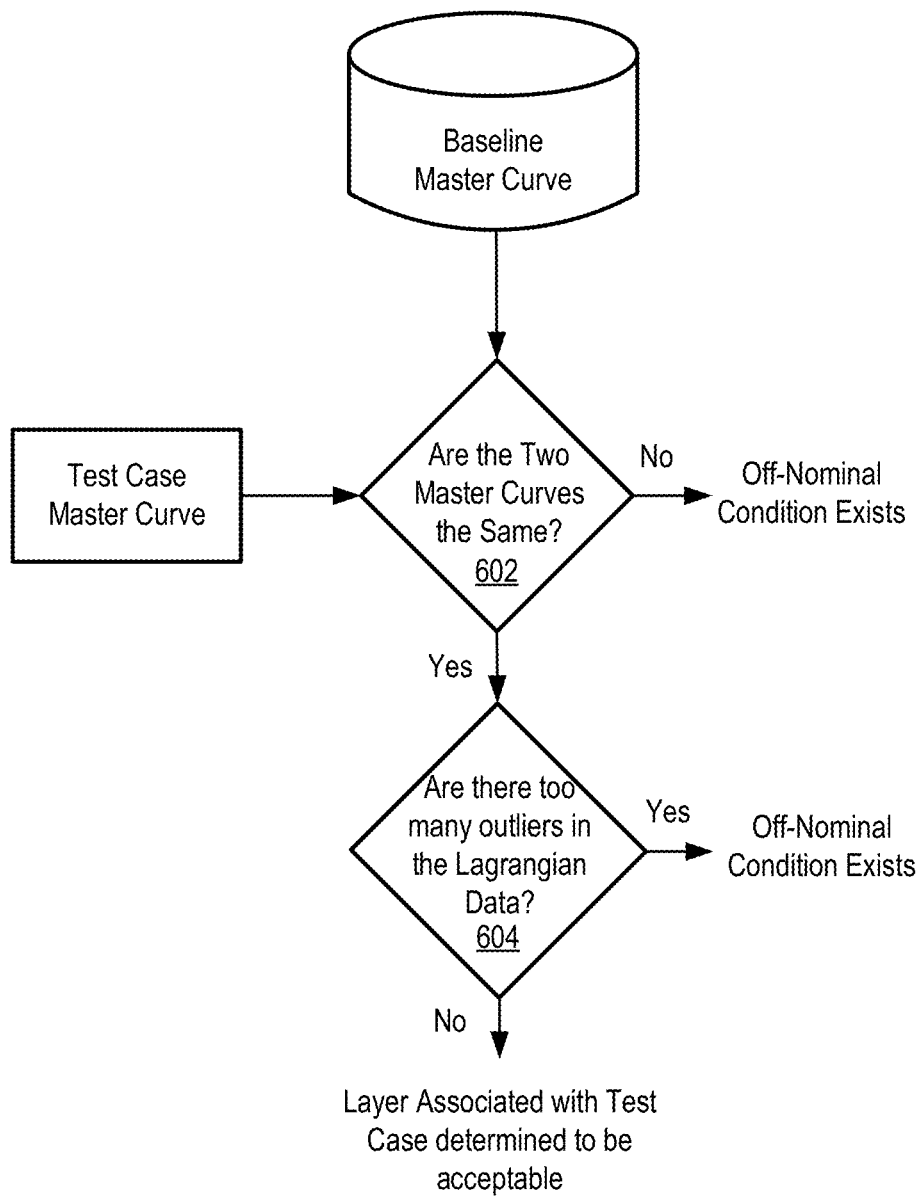
FIG. 6 shows a flowchart describing a method of operations suitable for use with the described embodiments.

FIG. 6 shows a flowchart describing a method of operations suitable for use with the described embodiments. At 602, a baseline characteristic curve is compared to a test case characteristic curve. This comparison can take many forms including but not limited a qualitative comparison in which the curves are overlaid. Alternatively, a more quantitative analysis can be performed in which a parametric best-fit is curve is generated to closely follow the characteristic curve.

The parametric equation can then be utilized to create a feature vector that could be used in a Mahalanobis Distance Analysis Other statistical tests could also be used to compare the characteristic curves by comparing means and variances associated with the curves. In each case, a threshold value can be assigned to determine what constitutes the two curves not being considered to be the same. A determination that the characteristic curves are not the same can generate an indication to an operator of the additive machining tools that an off-nominal condition exists for the layer associated with the test case. At 604, when the curves are deemed to be the same another test can be carried out to determine whether there are too many outliers for the layer. Data from a Lagrangian sensor, such as photodiode sensor 118 as depicted in FIG. 1, can be utilized to detect the outliers. Outliers can take the form of rapid temperature excursions at the melt pool that can be caused by unintentional fluctuations in power, and variations in powder material. In some embodiments, these outlier data points can actually be removed from the characteristic curve analysis so that the characteristic curves more closely represent the steady state conditions of the additive manufacturing process. Either way, when there are too many outlying Lagrangian data points or one data point is so high that the structural integrity of the layer is likely to be compromised, the layer can be tagged as amounting to an off-nominal condition. When there are few outlier data points the layer of the part can be determined to be acceptable.

It should be noted that while the examples pertain primarily to accounting for distance of the laser to the scan, direction of the scans and orientation of the scan that other data can be extrapolated from the recorded laser scan data. For example, when the scan strategy is known factors such as power variation, and laser speed among other factors could be harvested from the collected intensity and duration data provided by the PD signal. In some embodiments, the scan strategy can be provided by a controller associated with the laser. The scan strategy can provide position data for each of the scans made across the build plane. In some embodiments, this position data can be associated with intensity and duration characteristics of each scan recorded during the manufacturing operation.

B. Correlation between PD Signals and Pyrometer Signals

Figure 7A:
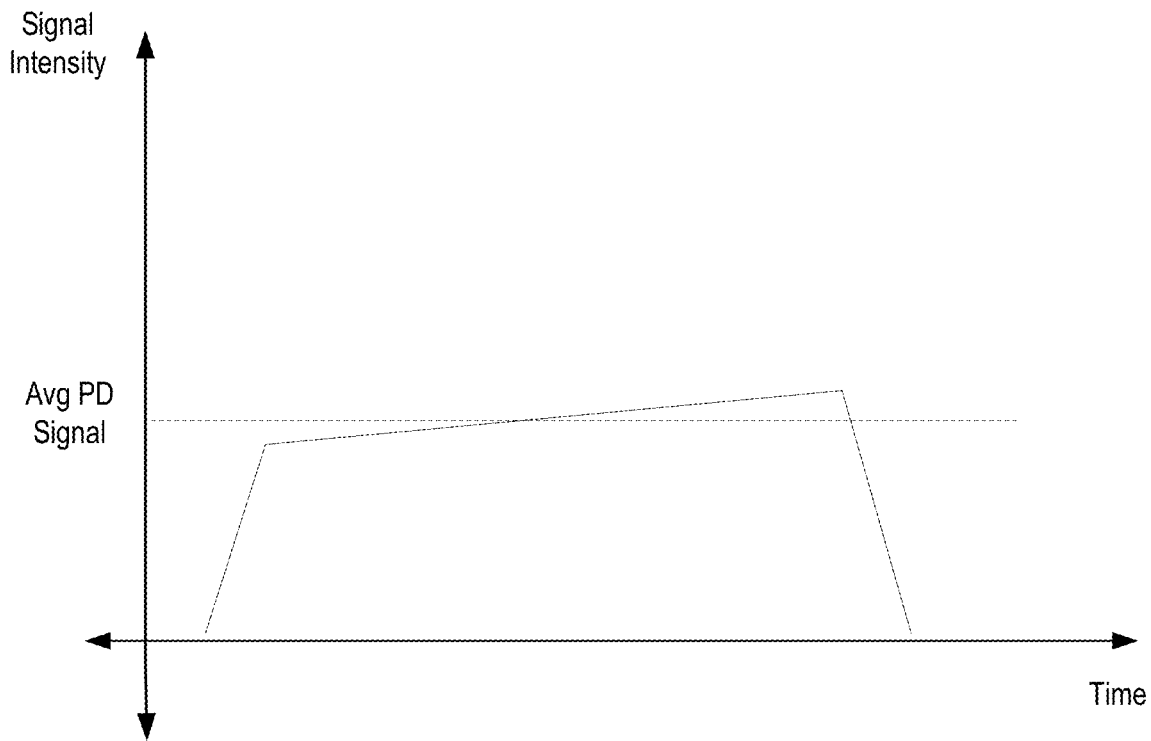
FIG. 7A shows an exemplary time based photodiode (PD) signal for a given scan length.

FIG. 7A shows an exemplary time based photodiode (PD) signal for a given scan length. In general, for shorted segments there could be a rise in the signal intensity with time because there may not be sufficient time to reach a thermal quasi-steady state condition. The dotted line represents the average PD signal. This is the input to the PD signal process method discussed earlier.

It is seen that in general there is a rise, and plateau, and a fall to the PD time based signal. Generally speaking, this corresponds to the heating rate, the (average) peak temperature during the scan, and the cooling rate. The problem is that the PD data is not calibrated at all and therefore it is difficult to assign physically relevant units to these qualitative quantities.

Figure 7B:
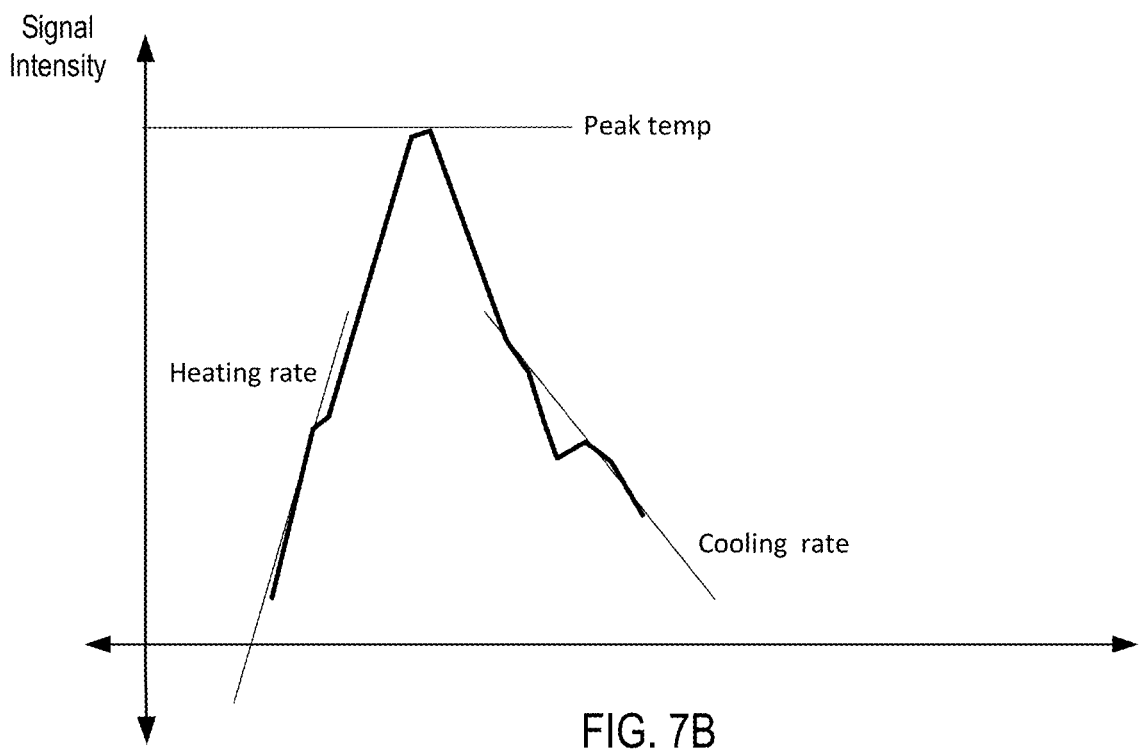
FIG. 7B shows a pyrometer signal used to indicate peak temperature, heating rate and cooling rate.

FIG. 7B shows a pyrometer signal collected by a sensor such as pyrometer 120 as depicted in FIG. 1. A comprehensive calibration method is discussed for using pyrometer signals to determine various characteristics of an additive manufacturing operation in U.S. application Ser. No. 14/945,247, which is entitled "Multi-Sensor Quality Inference and Control for Additive Manufacturing Processes", which is incorporated herein by reference in its entirety and for all purposes. Generally, the pyrometer data provides higher resolution calibrated temperature data that allows for the identification of features in the temperature curve that help to determine true peak temperature, heating and cooling rate information. However, it should be noted that in some cases photodiode data can also be used to characterize true peak temperature, cooling rate and heating rate.

Figure 8A:
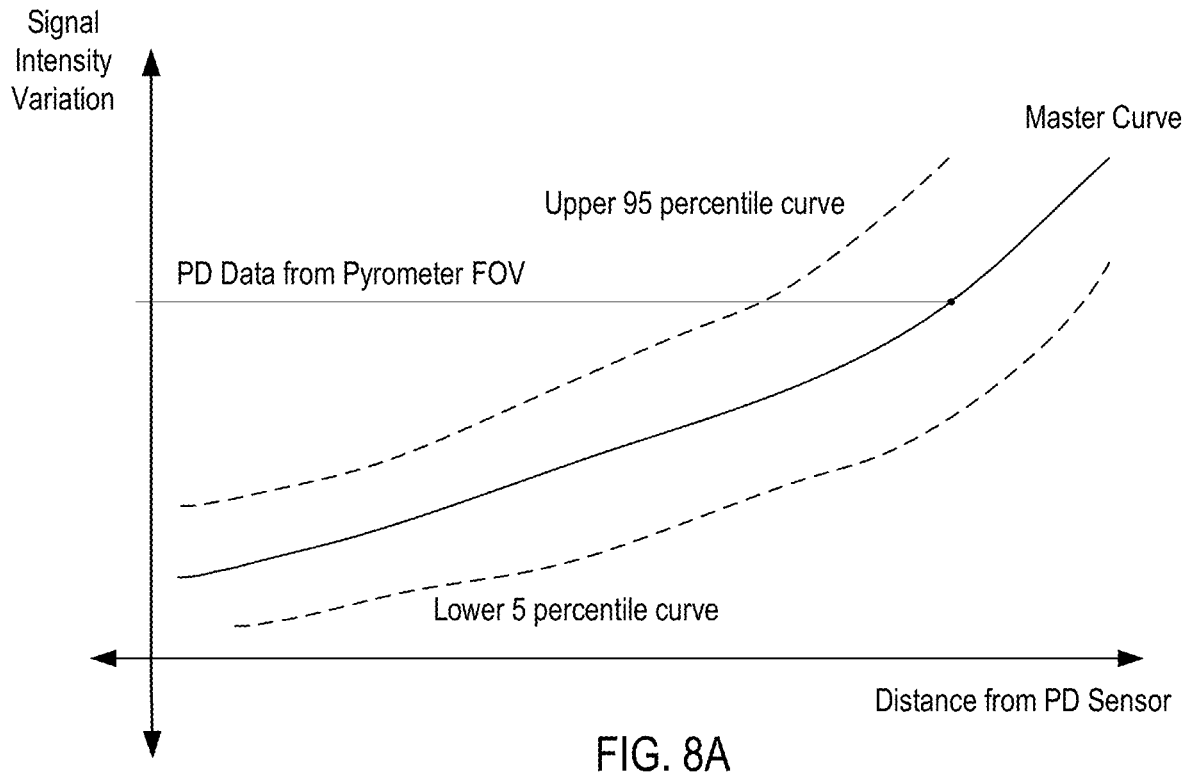
FIG. 8A shows an exemplary characteristic curve for a layer of a part.

FIG. 8A shows an exemplary characteristic curve for a layer of a part. If we look at the PD signal corresponding to corrected temperature curves from the pyrometer in the region of the pyrometer field of view, and if we process the PD data from the witness region using the same process used to generate the nominal PD characteristic curve for a given layer, then the PD data from corresponding to the pyrometer field of view falls at some point along the characteristic curve. As depicted in FIG. 8A, the PD sensor is relatively close to the pyrometer field of view, but there could be other regions in the part which are closer and therefore have a higher PD signal intensity. The point where the pyrometer data intersects the trend line for the PD characteristic curve can be viewed as a specific calibration point for this layer. It is reasonable to assign the peak temperature value to this point. However, the PD Characteristic curve should first be flattened out to some mean value to cancel out the effect of distance away from the sensor. The same data transformation would be applied to the "cloud" of points as well as the 5% and 95% percentiles.

Figure 8B:
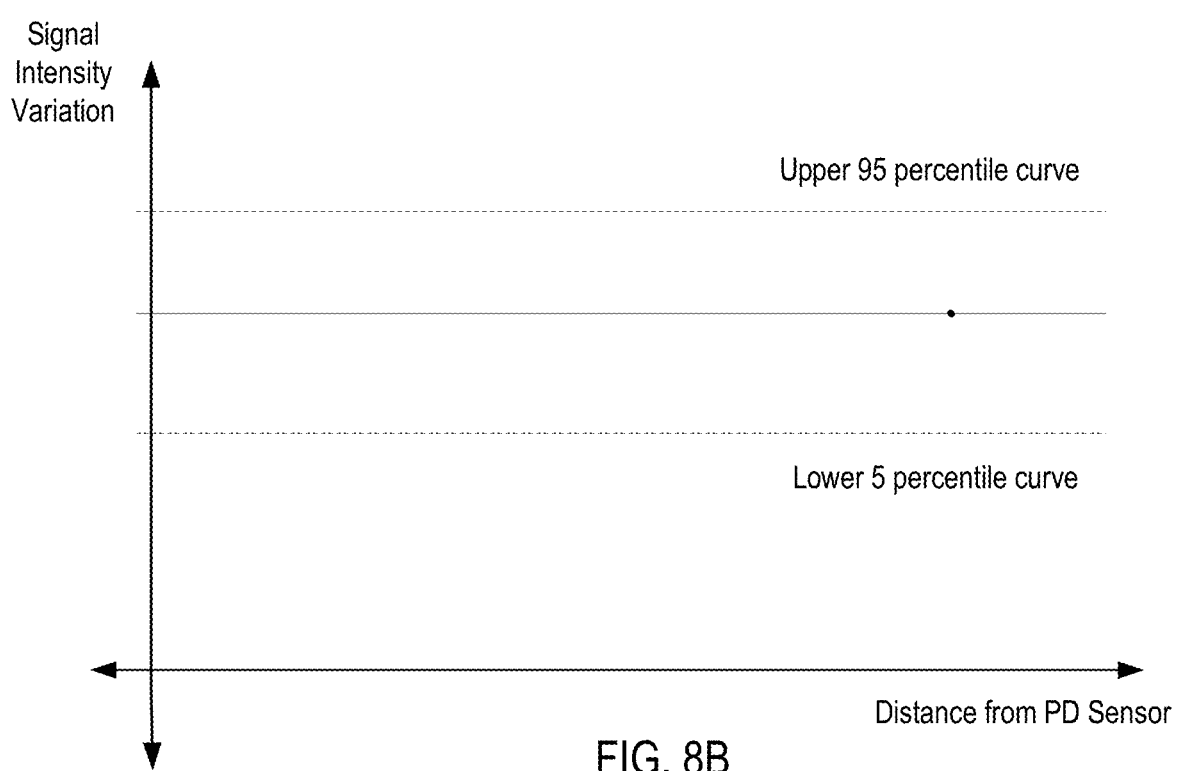
FIG. 8B shows a characteristic curve normalized with true temperature values.

This results in the following transformed data being generated that is depicted in FIG. 8B. The point shown in FIG. 8B above is the intersection point between the PD data from the witness region and the characteristic curve. Now it is a reasonable approximation to set the average PD value in the characteristic PD curve equal to the average peak temperature as measured by all the scans that went through the pyrometer field of view for that layer. The experimental 5% and 95% limit values are therefore also transformed into temperature upper and lower control limits naturally. Now when two characteristic curves are compared actual temperature values can be compared instead of relative sensor voltages. In some embodiments, a characteristic curve such as the one depicted in FIG. 8B could be compared with another flattened characteristic curve, and when trend lines fall within the 5 and 95 percentile boundaries the trend lines could be considered to be nominal. Stricter or looser thresholds could also be applied. It should be noted that while peak temperature is being applied in these examples, that pyrometric data can also be used to determine heating rate and/or cooling rate of different portions of the build plane.

Figure 9:
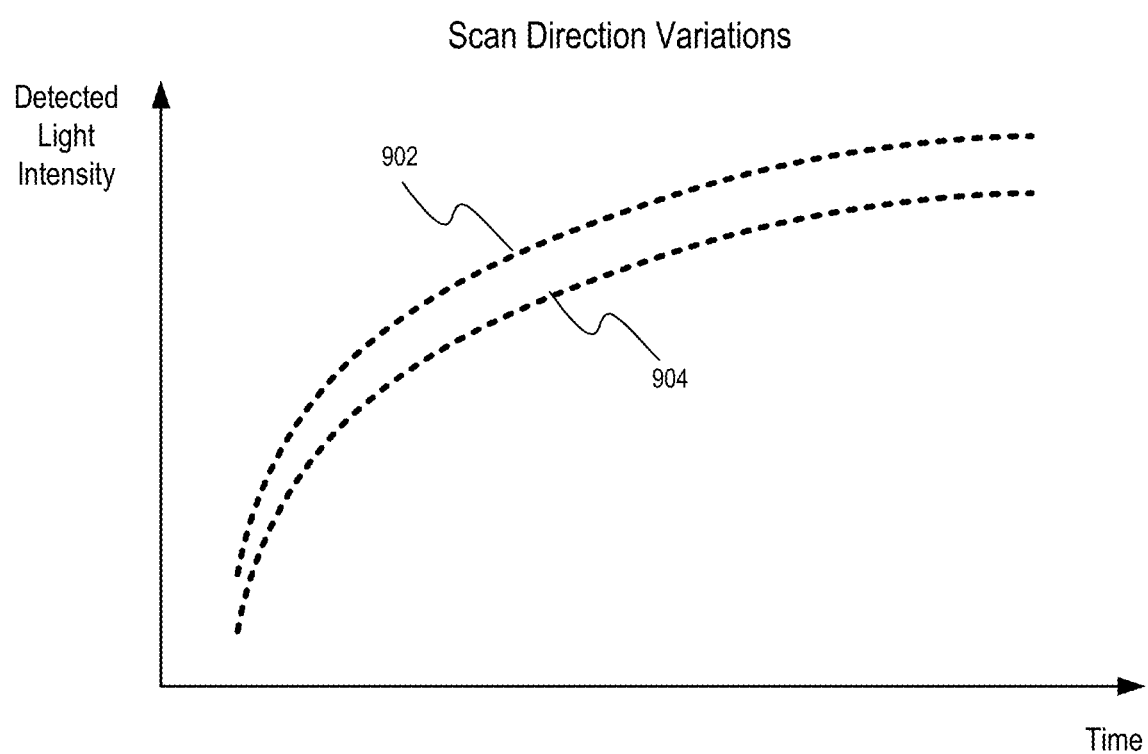
FIG. 9 shows a representation of two different laser scans oriented in opposing directions.

FIG. 9 shows a representation of two different laser scans oriented in opposing directions. Laser scans 902 and 904 can both be in roughly the same location and have the same duration but be oriented in opposing directions. Here it can be seen that laser scan 902 is consistently slightly higher than laser scan 904. This variation can be based upon powder collecting in front of the laser beam and blocking some of the intensity of the laser beam. One reason the scan direction has not been factored out is because when scan patterns have laser scans arranged in alternating directions, any variation due to direction gets averaged out when considering the characteristic curve as a whole. In embodiments where the scan pattern were more randomized, additional corrections could be implemented to clear up any variations due to scan direction. For example, a high-speed camera could be used to report on a direction of each scan and so that scan direction could be correlated with readings taken by a thermal sensor/photodiode.

Figure 10:
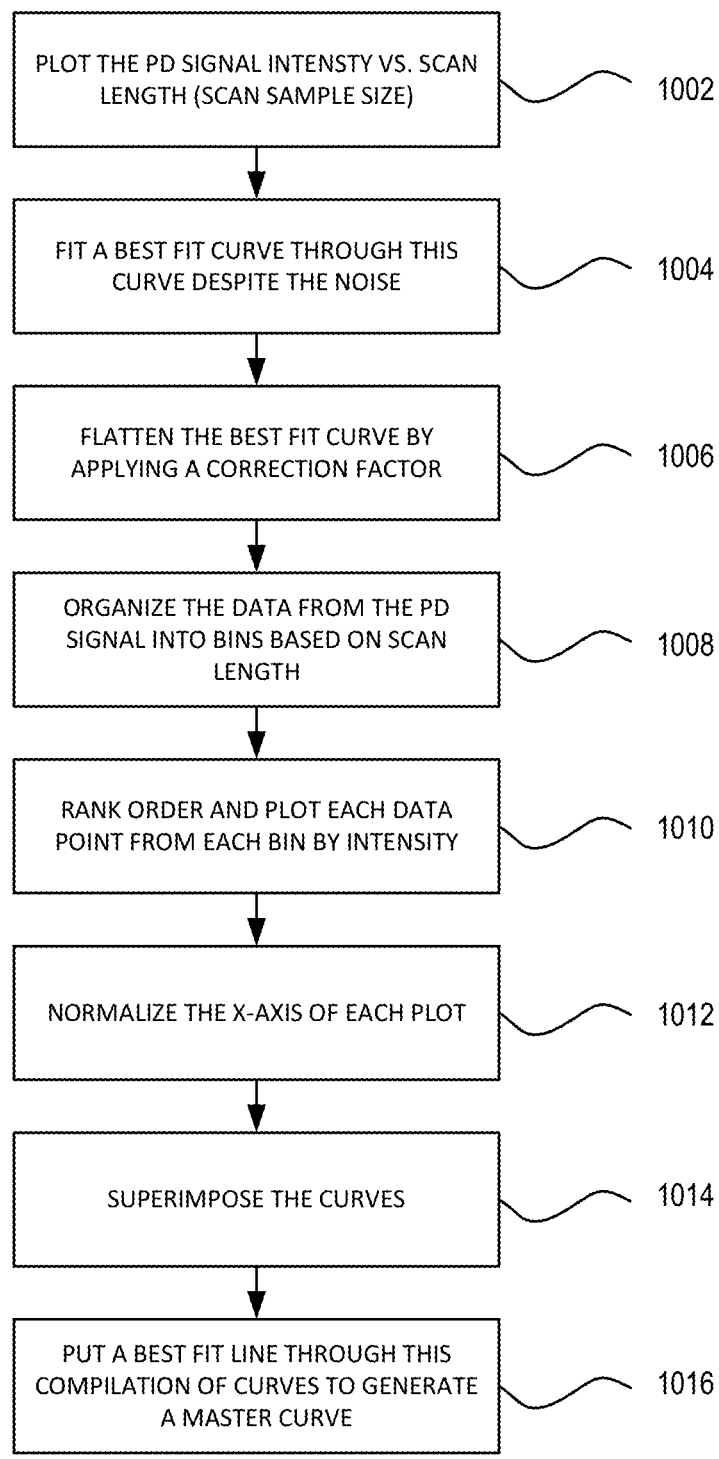
FIG. 10 shows a flow chart representing a method for removing geometric effects from thermal data collected by a thermal sensor such as a photodiode.

FIG. 10 shows a flow chart representing a method for removing geometric effects from thermal data collected by a thermal sensor such as a photodiode. At 1002, plot signal intensity vs scan length for every scan making up one layer of a part. At 1004, make a best-fit curve through the plot. At 1006, flatten the best-fit curve by applying a correction factor, so that the intensity variation for each different scan length is about equivalent. At 1008, organize the data from the signal intensity vs scan length into bins of similar scan length. At 1010, rank order and plot each data point from each bin by intensity. At 1012, normalize the x-axis of each plot so the plot of each bin is equivalent regardless of the number of data points. At 1014, superimpose the ranked scan length based curve. At 1016, put a best-fit line through this compilation of curves to generate a characteristic curve.

It should be appreciated that the specific steps illustrated in FIG. 10 provide a particular method of for removing geometric effects from thermal data collected by a thermal sensor according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Identification of Regions of Interest

Figure 11A:
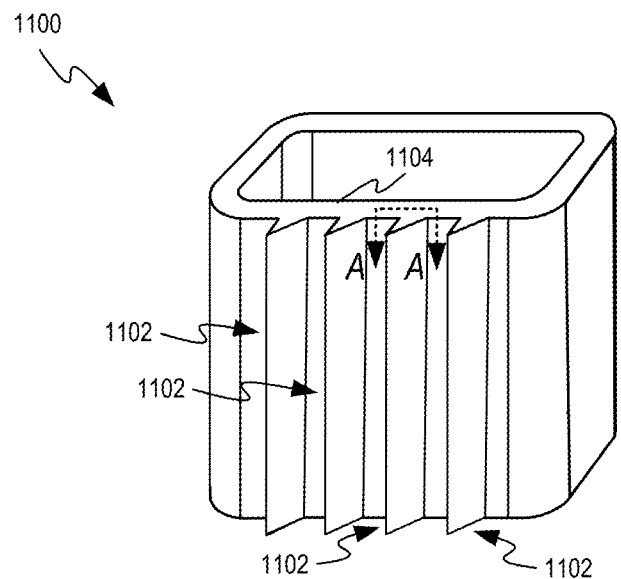
FIGS. 11A-11D show perspective and cross-sectional views of exemplary parts and scan patterns associated with particular features of the exemplary parts.
Figure 11B:
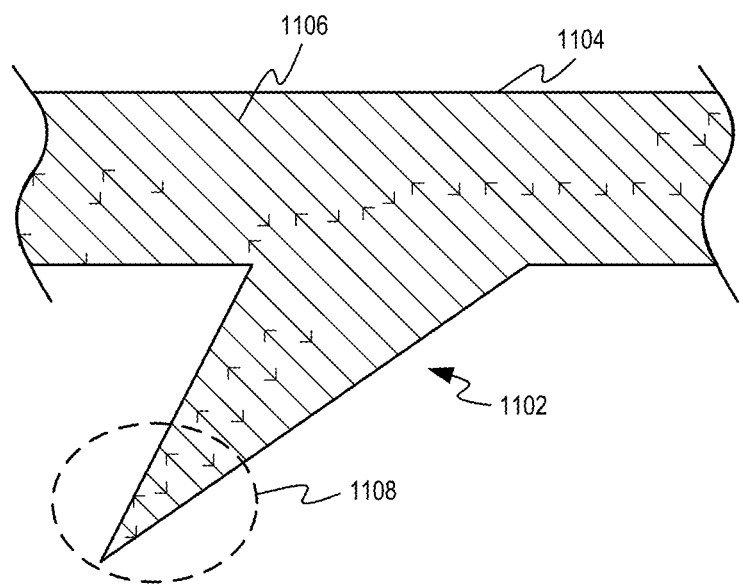

FIG. 11A shows a perspective view of an exemplary part 1100 suitable for manufacture by an additive manufacturing process. Part 1100 can include a series of protrusions 1102 arranged along a wall 1104 of part 1100. In some embodiments, protrusions 1102 can take the form of cooling fins configured to convectively dissipate heat from part 1100. FIG. 11B shows a cross-sectional view of a portion of part 1100 in accordance with section line A-A. A diagonal pattern of alternating direction scan lines 1106 are depicted. The pattern of scan lines 1106 illustrate how particular scan lines 1106 near a geometric feature such as tip region 1108 can be substantially shorter than the other scan lines used to build part 1100. This can also occur when generating parts with narrow walls that limit the effective scan length. For example, a series of channels extending through part 1100 could also create situations in which the scan pattern included particularly short scan lines 1106.

As previously shown in FIG. 3, these short scan lines can result in tip regions 1108 of protrusions 1102 not reaching a high enough temperature to properly form protrusions 1102 when scan lines 1106 fall below a threshold length at which a steady state temperature is achieved. In some embodiments, the amount of power delivered by the laser to tip region 1108 can be increased in order to deliver enough energy to avoid a situation in which tip region 1108 includes defects formed on account of a lower amount of energy being delivered than desired. Other solutions could include slowing the scan speed across smaller features of the part. Due to the shorter length of each scan line 1106 within protrusion 1102, it may be desirable to develop profiles that identify desirable scan profiles for scan lines 1106 that form each tip region 1108. By identifying the scan lines 1106 that form each of tip regions 1108, profiles can be determined for each tip region 1108. It should be appreciated that scan lines 1106 associated with a particular geometric feature can span multiple layers of the part.

In some embodiments, performance of the operation within a particular region of interest can be tested empirically by doing destructive testing on a batch of different parts. In this way, instead of having a characteristic curve for the entire part, characteristic curves can be developed for regions of interest within part 1100. By applying the curve to smaller regions of part 1100, small performance variations can become more evident. For example, when 95% of the scan lines associated with building the part are within normal operating parameters but the 5% outside of the normal operating parameters are localized within certain regions of the part, a characteristic curve incorporating all the scan line data could mask the presence of the 5% of measurements localized in a particular area of the part. In particular, when a threshold value is established at 25% off nominal and only 5% of the scans are flagged as being off-nominal, increasing the number of off-nominal scans by a factor of 5 times only increases the metric from 6.5% to 11%. This represents a substantial variation which can be difficult to detect when considering the part as a whole. Therefore dividing the part into regions as described above avoids this dilution effect.

Some factors that can be considered when identifying regions of interest within a part include at least the following: empirical evidence showing higher incidences of defects in a particular region; regions of high metallurgical cooling rates, either determined by physics based models, rules of thumb or prior experience; a 100% experiential rule which takes prior history and posterior probabilities of defect occurrence into account; and rules based on design guidelines provided by human experts.

Defects within the part can be caused by any one or more of the following parameters being outside nominal operating parameters: powder particle size distribution; particle composition and oxidation state; powder recycle state, i.e. state of reused powders; powder spreading method and consistency of this method; shielding gas composition, flow rate, and flow pattern (laminar vs. turbulent); laser power; laser focal characteristics; laser scan speed; laser scan head optical, mechanical, and opto-mechanical characteristics; programming variations and potential problems; scan pattern and scan strategy on a given layer; and scan strategy as it changes with geometry. Given the large number of potential sources of error, associating multiple characteristic curves with particular features of a part can be quite helpful in identifying and then recognizing the cause of any problem that arises.

Figure 11C:
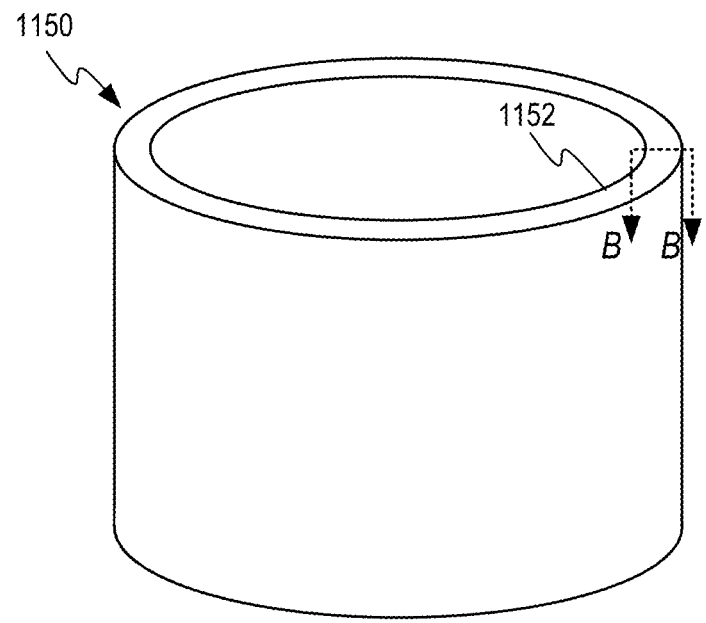
Figure 11D:
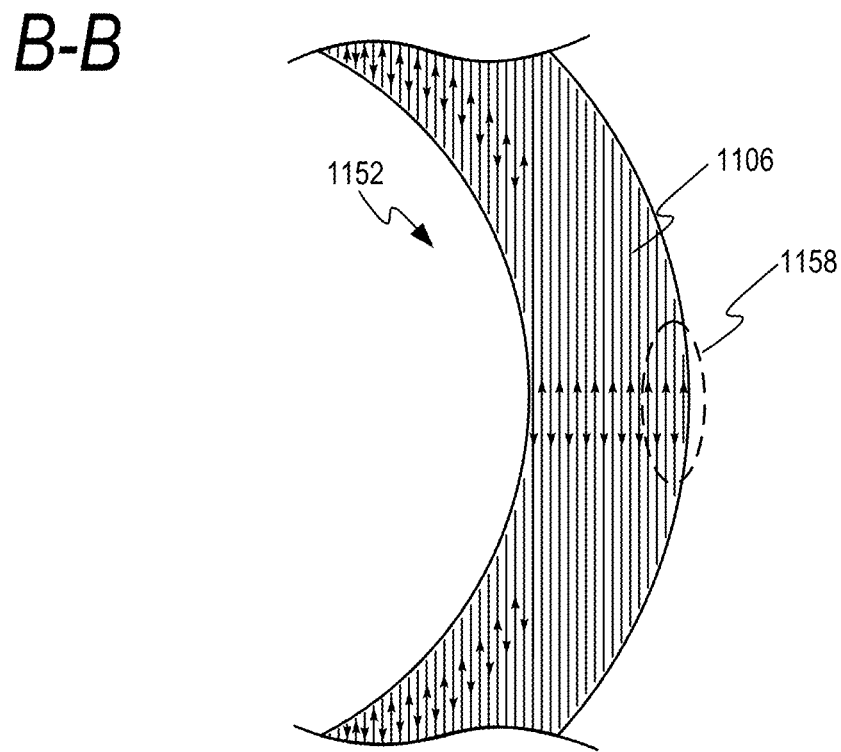

FIG. 11C shows a perspective view of an exemplary part 1150 suitable for manufacture by an additive manufacturing process. Part 1150 can include an oval shaped wall 1152 extending around a periphery of part 1150. FIG. 11D shows a cross-sectional top view of a portion of part 1150 in accordance with section line B-B. In particular, when the scan strategy results in scan lines 1106 being oriented as depicted, distal end region 1158 of part 1150 can narrow down to an extent that laser parameters need to be adjusted to deliver a sufficient amount of heat to distal end region 1158 when the laser scans along scan lines 1106 within distal end region 1158. Other features likely to increase off-nominal behavior include sharp corners, overhangs, etc. In some embodiments, regions of low risk can also be identified. For example, during normal operations every scan within a higher-risk area could be record, while areas within medium risk areas could be periodically sampled and areas within low risk areas could be ignored.

It should be appreciated that the described methods based on characterizing an additive manufacturing operation using recorded laser scans could also be applied in other industries. For example, in a laser marking operation separate regions could be associated with each letter, number or indicia associated with a particular laser marking operation.

Depending on complexity each letter could be more or less closely monitored for defects.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of using an additive manufacturing system including a processor, the method comprising:
   generating an energy beam;
   directing the energy beam across a work piece along a plurality of scan lines to fuse a layer of powder to the work piece, wherein each scan line of the plurality of scan lines includes a respective scan length;
   using the processor to acquire data from an optical sensor arranged to receive optical emissions from the layer while the energy beam is directed across the work piece;
   using the processor to generate, using the acquired data, a characteristic curve of a variation of optical emission intensity for the plurality of scan lines, wherein the optical emission intensity is corrected for a variation in the scan length of the plurality of scan lines; and
   using the processor to compare the characteristic curve to a baseline characteristic curve to detect a potentially defective region in the work piece.

2. The method of claim 1 wherein a unique baseline characteristic curve is generated for each respective layer that is fused to the work piece.

3. The method of claim 1 wherein the baseline characteristic curve is a characteristic curve of a same layer of a different work piece and the potentially defective region is identified by a deviation of the characteristic curve from the baseline characteristic curve.

4. The method of claim 1 further comprising correcting the optical emission intensity for a variation in a distance between the optical sensor and each respective scan line of the plurality of scan lines.

5. The method of claim 1 wherein the acquired data comprises an intensity of the optical emissions from the layer for each scan line of the plurality of scan lines.

6. The method of claim 1 wherein the acquired data from the optical sensor indicates a temperature at the layer.

7. The method of claim 1 wherein the energy beam is a laser beam.

8. The method of claim 7 wherein the acquired data from the optical sensor indicates a duration of each scan line of the plurality of scan lines based on a change in detected intensity.

9. The method of claim 7 wherein the optical sensor shares optics with the laser beam.

10. An additive manufacturing system comprising:
    a powder bed adapted to hold a work piece;
    an energy beam arranged to fuse a layer of powder to a work piece via a plurality of scan lines distributed across the work piece, wherein each scan line has a respective scan line length;
    a sensor arranged to receive optical emissions from the layer of powder; and
    a processor arranged to receive data from the sensor and adapted to:
        generate a characteristic curve of a variation of an intensity of the optical emissions related to each scan line of the plurality of scan lines, wherein the intensity is corrected for a variation in the scan line length of the plurality of the plurality of scan lines; and
        compare the characteristic curve to a baseline characteristic curve to detect a potentially defective region of the work piece.

11. The additive manufacturing system of claim 10 wherein the baseline characteristic curve is generated for each respective layer that is fused to the work piece.

12. The additive manufacturing system of claim 10 wherein the baseline characteristic curve is a characteristic curve of a same layer of a different work piece.

13. The additive manufacturing system of claim 10 wherein the intensity is further corrected for a variation in a distance between the sensor and each respective scan line.

14. The additive manufacturing system of claim 10 wherein the optical emissions are a peak intensity of the optical emissions.

15. The additive manufacturing system of claim 10 wherein the optical emissions indicate a temperature at the layer.

16. The additive manufacturing system of claim 15 wherein the energy beam is a laser beam.

17. The additive manufacturing system of claim 16 wherein the processor is further adapted to determine a duration of each scan line of the plurality of scan lines based on a change in detected intensity.

* * * * *